Oct. 25, 1966 G. L. DUGGER ETAL 3,280,565
EXTERNAL EXPANSION RAMJET ENGINE
Filed Jan. 10, 1963 4 Sheets-Sheet 1

GORDON L. DUGGER
JAMES L. KEIRSEY
ROBERT W. McCLOY
INVENTORS

BY Claude Funkhouser
ATTORNEY

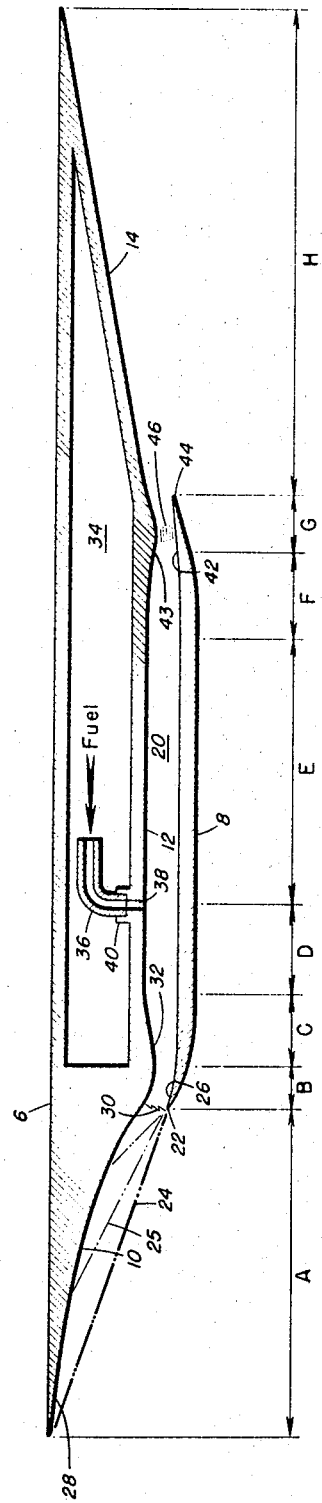
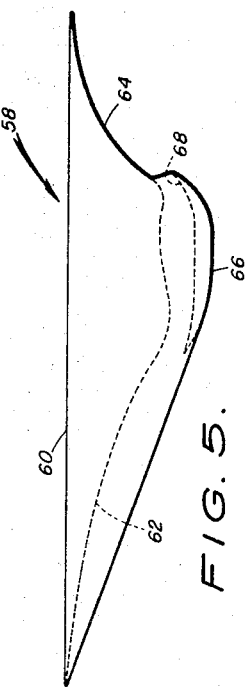

Oct. 25, 1966 — G. L. DUGGER ETAL — 3,280,565
EXTERNAL EXPANSION RAMJET ENGINE
Filed Jan. 10, 1963 — 4 Sheets-Sheet 3

GORDON L. DUGGER
JAMES L. KEIRSEY
ROBERT W. McCLOY
INVENTORS

BY Claude Funkhouser
ATTORNEY

Oct. 25, 1966
G. L. DUGGER ETAL
3,280,565
EXTERNAL EXPANSION RAMJET ENGINE
Filed Jan. 10, 1963
4 Sheets-Sheet 4
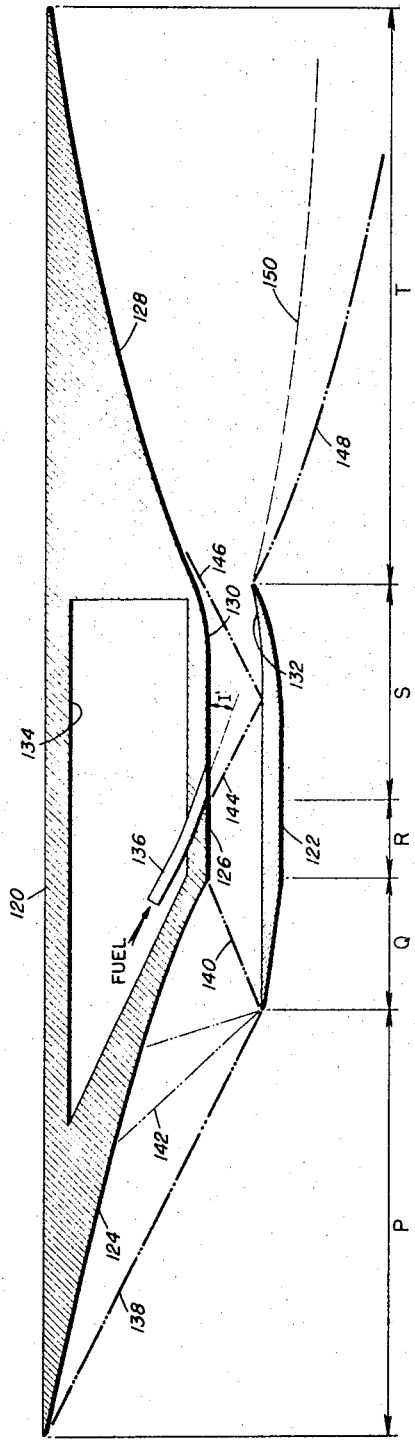
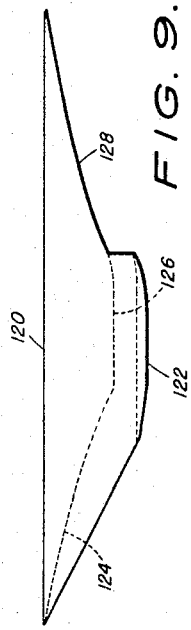
GORDON L. DUGGER
JAMES L. KEIRSEY
ROBERT W. McCLOY
INVENTORS
BY Claude Funkhouser
ATTORNEY 3,280,565
EXTERNAL EXPANSION RAMJET ENGINE
Gordon L. Dugger, Silver Spring, and James L. Keirsey, Rockville, Md., and Robert W. McCloy, Urbana, Ill., assignors to the United States of America as represented by the Secretary of the Navy
Filed Jan. 10, 1963, Ser. No. 250,992
2 Claims. (Cl. 60—270)

This invention relates generally to ramjet engines for propelling missiles, aircraft and the like, and more particularly to an improved ramjet engine designed for operation at speeds substantially in excess of sonic velocity, and wherein incoming air is compressed by an external diffuser and burned gases are expanded externally over a rearwardly-facing surface to produce thrust.

Ramjet engines of the cylindrical duct type have been known for same time, and normally consist of an air inlet, or diffuser, followed by an elongated cylinder through which air compressed by the diffuser flows. Fuel in injected into the cylinder and is burned therein to increase the temperature and velocity of the flowing air, which is then accelerated through an internal exhaust nozzle to produce thrust. For flight speeds substantially greater than sonic velocity, say upwardly from about Mach 4, cylindrical duct, internal burning engines with internal flow nozzles possess several undesirable characteristics, among which are their size, weight, and the very high operating temperatures and pressures encountered at such velocities. Exceedingly high temperatures and pressures often adversely affect the materials from which cylindrical ramjet engines are fabricated, and hence complex cooling apparatus must be provided throughout the length of the combustion chamber and nozzle, and structural reinforcing must be employed, if these engines are to function satisfactorily at high flight speeds.

Recently attention has been given to ramjet engines having no duct, and in which burning of the fuel occurs exteriorly of the engine body. Such an external burning ramjet engine is the subject of U.S. Patent No. 3,008,669, to F. I. Tanczos et al., and may consist of no more than an inverted wedge. The forward ramp of the wedge acts to compress air flowing over the engine. Fuel is injected into the compressed airstream and is burned under the rearwardly-facing ramp of the engine, producing a degree of thrust and lift. While such engines are very simple in construction and greatly simplify cooling problems, their efficiency is substantially lower than is desired.

Amonk the reasons for the relatively poor thrust production of the simple inverted wedge engine is that in order to produce a thrust force on a rearwardly-facing surface the flow must be allowed to turn around the knee of the engine, during which turning the airflow expands and substantial pressure losses are incurred. The pressure loss due to this expansion must first be compensated for by the combustion process before further combustion can raise the pressure levels on the rearwardly-facing surface to values which will produce thrust. Further, in the simple inverted wedge engine only a small stream of air near the surface of the wedge may take part in the combustion process, whereas a much larger stream of air may have been compressed by the forwardly-facing compression surface; thus, energy is also wasted in the compressive action.

The ramjet engine of the present invention has a main body somewhat similar to the simple inverted wedge ramjet engine. However, the problems discussed immediately hereinabove are alleviated therein by the use of a cowling placed a short distance from the main engine body. In one principal embodiment of the invention the front lip of the cowling is slightly inturned to capture and turn the air flowing over the front ramp of the engine, and the trailing lip of the cowling is inwardly inclined to favorably deflect the flow toward the exposed nozzle ramp or spike prior to the supersonic expansion thereof. In a second principal embodiment of the invention, designed especially for operation at hypersonic flight speeds, a favorable shock wave pattern is utilized in cooperation with the cowling to turn the airflow. In both of these embodiments the use of the cowling permits the capture of a relatively great volume of air, and maintains pressures at levels comparable to those within the conventional cylindrical duct type of ramjet engine, whereby to produce high thrusts.

Another problem with the simple inverted wedge engine is the difficulty encountered therein in burning fuel in the totally exposed airflow. In the present invention the cowling extends axially along the main engine body a distance sufficient to insure that the airflow is smoothed and straightened, that the fuel is properly mixed with the air, and that desirable combustion conditions will ensue.

The cowling employed in the present invention is normally but a thin member which is exposed to the freestream airflow. Further, the ramp compression and expansion surfaces on the main engine body are substantially totally exposed to said airflow. Hence, cooling by radiation is possible, and in most situations little, if any, additional cooling apparatus will be necessary for the engine. Thus, the cowled engine of the invention is lighter in weight than conventional cylindrical duct ramjets, and retains nearly all of the desirable cooling features of the simple inverted wedge engine.

Another significant advantage of external expansion is that a lifting force (as well as the necessary propelling thrust force) is provided due to the deflection of the burned gas away from the expansion surface. With a properly integrated design of the engine with the airframe of a vehicle, the former can provide a substantial fraction of the vehicle lift; this results in improvement of the overall ratio of lift to drag, and thus increases the vehicle efficiency. The external expansion engine can thus provide increases in cruise range of about 5 to 10 percent compared to vehicles equipped with conventional reaction engines with internal flow nozzles.

It is an object of this invention to provide a ramjet engine for operation at flight speeds in excess of sonic velocity, and so constructed as to produce thrust and a degree of lift by expanding hot gases over an external surface thereof.

Another object of the invention is to provide a supersonic ramjet engine having an external diffuser so constructed that substantially all of the supersonic compression of air entering the engine is accomplished by said external diffuser.

A further object of this invention is to provide an external compression, external expansion ramjet engine capable of operating at speeds greater than that of sound, and so constructed that air will flow therethrough with a minimum of pressure losses.

A still further object of the invention is to provide a cowled, external expansion, supersonic ramjet engine so constructed as to separate the diffuser shock wave from the zone where fuel is burned to thereby allow sufficient time for proper mixing of the fuel with the airflow.

Yet another object of this invention is to provide a cowled, supersonic ramjet engine having a rearwardly-facing, suitably contoured expansion surface, and so constructed that sonic, heated gases flowing from under said cowling will be turned to flow over said external expansion surface at an angle which provides the most advantageous supersonic expansion pattern and which produces a degree of lift along with the desired forward thrust.

It is also an object of the invention to provide a supersonic ramjet engine having a forwardly-facing isentropic ramp diffuser surface, a rearwardly-facing expansion surface, and a cowling, the engine being so constructed that the cowling will capture a quantity of the air compressed by the external diffuser surface and will turn its direction of flow to cause it to flow through the engine with a minimum of pressure loss.

A still further object of the invention is to provide a ramjet engine that is simple in construction and relatively easy to cool.

Another object of the subject invention is to provide a ramjet engine capable of operating at hypersonic velocities, and so constructed as to obtain constant pressure fuel combustion within a supersonic airstream.

An even further object of this invention is to provide a substantially all-external diffuser for a hypersonic ramjet engine, said diffuser being so constructed as to utilize favorable supersonic shock wave patterns to compress and turn incoming air.

Other objects and many of the attendant advantages of this invention will be readily appreciated as the same becomes better understood by reference to the following detailed description when considered in connection with the accompanying drawings, wherein:

FIG. 4 is a diagrammatic, axial section of the engine shown in FIG. 2;

FIG. 5 is a side elevation of a modified version of the ramjet engine of FIG. 2;

FIG. 8 is a diagrammatic, axial section of a second embodiment of a hypersonic ramjet engine constructed according to the invention; and FIG. 9 is a side elevation of the hypersonic ramjet engine of FIG. 8.

The ramjet engine of the subject invention may be of either a two-dimensional or a half-round configuration, and comprises an external supersonic diffuser, a short flow duct in which fuel is mixed with air flowing therethrough and burned, and an external, rearwardly-facing surface which functions generally in the manner of a plug nozzle. The engine has a main body and a cowl, the external diffuser being formed by a forwardly-facing surface on said body. The cowl is affixed to the central portion of the body in spaced relationship to thereby form the flow duct, and in one embodiment of the invention, designed primarily for operation at relatively low supersonic speeds, has an inclined lip on its forward edge for capturing and turning air compressed by the diffuser surface and an inclined lip on its rear edge for directing the flow of burned gases over the expansion surface. In another embodiment of the invention, designed especially for operation at hypersonic speeds, the airflow is directed by favorable shock wave patterns rather than by inclined cowl portions.

In operation, the engine is attached to the under surface of a missile or an aircraft, with the ramps and the cowling facing generally downward. The aerial vehicle is accelerated to the design take-over speed of the engine by suitable means, when air will flow through said engine in sufficient quantity and at a sufficient pressure to sustain its operation. The freestream air, flowing at a supersonic speed relative to the engine, is compressed by the forward ramp. In the lower supersonic speed embodiment of the engine the compressed air is captured and turned in the known manner by the lip on the forward edge of the cowl, and passes into the subsonic flow duct where fuel is added and burned. In the hypersonic embodiment of the invention favorable shock waves are established between the cowl and the main engine body and function to compress and turn the airflow into a supersonic flow duct defined between the cowl and the main body, where fuel is added and burned. In both embodiments the burned gases flow from under the cowling, and are expanded supersonically over the rearwardly-facing surface, producing thrust and lift.

Figure 1:
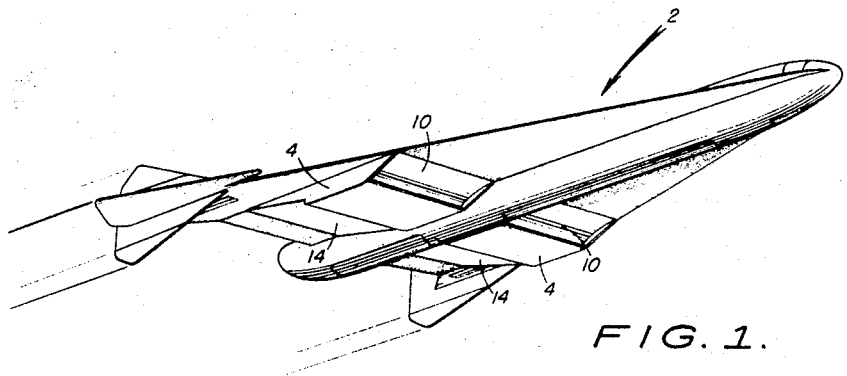
FIG. 1 is a bottom perspective view of an airplane employing a pair of supersonic ramjet engines constructed according to the invention.
Figure 2:
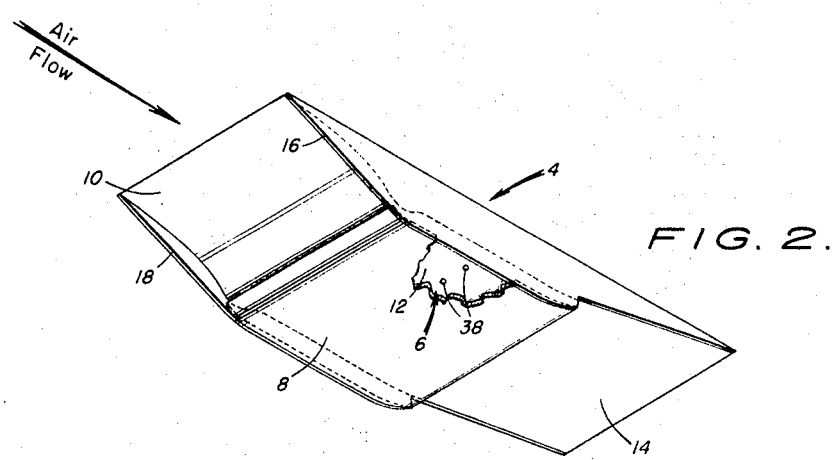
FIG. 2 is an enlarged, partially broken away perspective of a two-dimensional embodiment of the present invention.

Referring now to the drawings, an aircraft is indicated at 2 in FIG. 1, and has a pair of two-dimensional, external expansion ramjet engines 4 secured to the under surface of the wings thereof, said engines being designed primarily for operation at flight speeds up to about Mach 5. As is best shown in FIGS. 2 and 4, each engine 4 includes a main body 6 and a cowl 8. The main body includes a forward ramp 10, a central ramp 12, and a rearward ramp 14, said ramps being confined by a pair of side plates 16 and 18 (not shown in FIG. 4 for purposes of clarity) which are secured to the main body and to the cowl 8 by suitable means, which will vary with the design of and the operating conditions for the engine. The cowl is positioned over and is spaced from the central ramp 12, and together with said side plates 16 and 18 defines a duct 20. Interior struts (not shown) may be provided within the duct as required to give stiffness and dimensional stability to the structure, in which instance the ducted flow areas are adjusted accordingly to maintain the desired flow conditions.

The forward ramp 10 functions as an external diffuser, and following a small initial wedge section 28 is curved in the known manner to form an isentropic compression surface. The diffuser is designed for operation at a specified Mach number, say Mach 5, and the forward edge 22 of the cowl 8 is so positioned that the compression shock wave and Mach waves formed by the ramp 10, indicated at 24 and 25, respectively, in FIG. 4, will coalesce on said edge 22 when the engine is cruising at its design velocity. As is known, a shock wave indicates a step-change in airflow direction accompanied by irreversible compression and a loss in stagnation pressure, whereas a Mach wave simply indicates that the airflow is gradually compressed and turned isentropically. The mathematical techniques for dimensioning the isentropic ramp 10 and the forward edge 22 of cowl 8 to obtain such shock-on-rim operation are well-known, and hence will not be herein described.

The internal surface, or lip 26 of the forward end of cowl 8 is inclined in the conventional manner at an angle to the horizontal such that air compressed by the surface 10 will be captured and caused to flow into duct 20. The specific inclination for the lip 26 of the cowl should be selected to provide a maximum of air capture together with a minimum of internal pressure loss and a minimum of external drag for a particular engine design; in the engine shown in FIG. 4, which is designed for operation at Mach 5, an angle of inclination of about 23.8 degrees has been found to be satisfactory for said lip where the inclination of the forward initial wedge section 28 of ramp 10 is about 7 degrees.

The ramp surface opposite the inclined lip 26 is nearly parallel therewith, thus forming an air turning duct of substantially uniform cross-sectional area. In operation a normal shock wave 30 is formed at the forward edge 22 of the cowl 8, and hence air flowing into the turning duct defined between lip 26 and the opposite ramp surface will have been diffused to subsonic velocity.

Immediately behind lip 26 the internal surface of the cowl 8 becomes horizontal, whereas the forward end 32 of the central ramp 12 is rounded and merges with the front ramp 10. The region between the rounded surface 32 and the internal wall of cowl 8 thus forms a subsonic diffuser that functions to further slow and increase the pressure of air entering duct area 20.

The main body 6 of the engine has a chamber 34 therein, within which is disposed a plurality of fuel distributing manifolds 36. The central plate 12 has a row of aligned ports extending thereacross, each of which defines a fuel injection nozzle 38. Each nozzle-defining port has a collar 40 extending therearound and protruding into the chamber 34, the manifolds 36 being fitted to said collars. Fuel from a suitable source (not shown) is admitted to the manifolds and flows from the nozzles 38 into duct 20, where it is mixed with the subsonic airflow therein. The position for the nozzles 38 and the number employed are dependent upon the fuel utilized by the engine, the volume, velocity, and sensible heat content of the air flowing through the duct 20, and other factors, the manner of calculating the desired position and number of nozzles being known. Generally, when the flight speed is near Mach 5 and when hydrocarbon fuels are employed the row of injection nozzles should be near the forward end of duct 20, and when higher flight speeds or more reactive fuels, such as pyrophoric fuels, are employed said nozzles should be nearer the aft end of said duct. Thus, the total length of the cowl 8, and hence the total length of the engine, is dependent to a great extent upon the flight speed and the fuel employed, and in the case of high flight speeds or highly reactive fuels may be extremely short.

While no igniter for the fuel is illustrated, it is to be understood that when the engine is flown at moderate supersonic speeds some fuels will require an ignition means, and may also require a flame-stabilizing device in the duct. At flight speeds above about Mach 5, or with the more highly reactive fuels, the fuel will normally be ignited upon exposure to the airstream within the duct; in these instances neither an igniter nor a flameholder will be required. When an igniter is required it is mounted within the duct adjacent the row of nozzles 38.

The chamber 20 is of such a length downstream of the row of injection nozzles that the fuel has sufficient time to mix with the airflow and burn efficiently at the design operating conditions.

The aft end 42 of the cowl is curved slightly and is inclined inwardly at its outer end toward the body 6 at an angle which will turn the flow of burned gases over the rearwardly-facing expansion surface 14 in the direction which will result in the most favorable expansion characteristics. The surface 12 has near its aft end a transversely-extending, rounded, relatively small in height protrusion 43 which cooperates with the curved end 42 of the cowl to define a slight constriction or nozzle throat, the surface 42 extending sufficiently to carry the burned gases slightly beyond said protrusion.

In FIG. 4 the ramp 14 is at a 10 degree angle to the horizontal, and for such an inclination it has been found that a suitable inclination for the outer end of surface 42 is about 5 degrees. More effective expansion may be obtained by employing greater lip inclinations and curved expansion surfaces, as shown in FIG. 5 and described hereinafter. The aft edge 44 of the cowl 8 is so positioned that the burning gases will be accelerated and will pass through sonic velocity in region 46, and will then issue from under the cowl to expand supersonically over the surface 14.

In operation, the cycle of the ramjet engine of FIGS. 2 and 4 is as follows. The engine is first accelerated to its designed take-over speed, from which speed it may either begin its cruise or accelerate to a higher design cruise speed. At take-over velocity incoming air is compressed isentropically in the region A (FIG. 4) by ramp 10, side plates 16 and 18 serving to contain the compressed air and prevent its spilling over the edges of the ramp, thus maintaining the desired mass flow of said compressed air. An oblique shock wave 24 is formed and attaches to edge 22 at design speed, providing shock-on-rim operation; the normal shock wave 30 is formed between the cowl and the engine body 6.

The compressed air captured between the lip 26 and the ramp 12 is turned over the length of region B. The two-dimensional subsonic diffuser region C further slows and increases the pressure of the air, and said air then flows through degion D in duct 20, wherein the flow is straightened and smoothed. Fuel is injected into the airstream and is vaporized and mixed in the region E and burned in a short length in the region F, and the resultant hot gases pass through sonic velocity in the region 46 and are deflected by surface 42 over region G to expand over the region H under ramp 14, producing thrust and a degree of lift.

The engine of FIG. 2 is two-dimensional in configuration, a shape which is desirable for many applications. However, it is to be understood that the engine of the invention might also assume other cross-sectional configurations, as for instance the half-round shape shown in FIG. 3.

Figure 3:
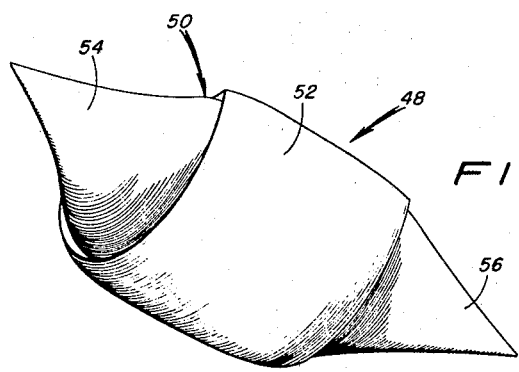
FIG. 3 is a bottom perspective of a second, half-round embodiment of the supersonic ramjet engine of the invention.

Referring to FIG. 3, a half-round external expansion ramjet is shown at 48, and includes an engine body 50, a cowl 52, an isentropic compression surface 54, and an expansion surface 56. The latter surface 56 is also formed to produce isentropic flow, because for many applications such an isentropic expansion surface provides results superior to the simple inclined wedge surface 14 of FIG. 2. It is to be understood that the use of either an isentropic expansion surface or a flat, inclined expansion surface are both within the teachings of the invention. Thus, the use of an isentropic expansion surface with a two-dimensional engine is also within the scope of the invention, such an engine being shown in elevation in FIG. 5.

Referring to FIG. 5, a two-dimensional ramjet engine 58 is shown in elevation, and comprises a body 60 having thereon an isentropic compression surface 62, an isentropic expansion surface 64, and a cowl 66. The length of the cowl 66, and hence the length of its associated engine, is substantially less than the length of the cowl 8 of the engine of FIG. 2, which as explained hereinabove is possible when the time required for fuel ignition and burning is sufficiently short. When an isentropic expansion surface is employed the inner, aft surface 68 of the cowl must normally be inclined at a much greater angle to insure the desired expansion pattern, an angle of from 45 to 60 degrees being commonly employed.

The ramjet engine of the invention is relatively easy to cool, the compression and expansion ramps and the cowl being exposed to the atmosphere. In certain applications supplemental mechanical cooling means may be needed in addition to cooling by radiation, but such apparatus will be much smaller than in conventional ramjets having convergent-divergent nozzles.

While the ramjet engine of the invention has been thus far described in relation to an isentropic, all external diffuser, it is to be understood that a non-isentropic compression ramp, such as a multiple-wedge or multiple-cone compression surface, might also be utilized. Further, in some instances a degree of internal diffuser action might be desirable. Thus, the invention should not be considered limited to the diffuser shown, but should be extended to include other diffuser forms which are substantially all-external in operation.

The ramjet engine embodiments of FIGS. 1–5, as has been stated, are designed primarily for supersonic flight speeds in the range from about Mach 3 or 4 up to about Mach 6 or 7. When flown at still higher speeds in the hypersonic range, which range begins at and extends upwardly from about Mach 5, these engine embodiments begin to lose their desirability. The reason for this is that ramjets employing subsonic combustion suffer adversely from dissocation of the airflow and non-equilibrium exhaust flow when flight speeds reach very far into hypersonic values. Accordingly, another embodiment of the present invention especially designed for operation at hypersonic speeds is shown in FIGS. 6 and 7, said embodiment utilizing supersonic rather than subsonic fuel combustion.

Figures 6, 7:
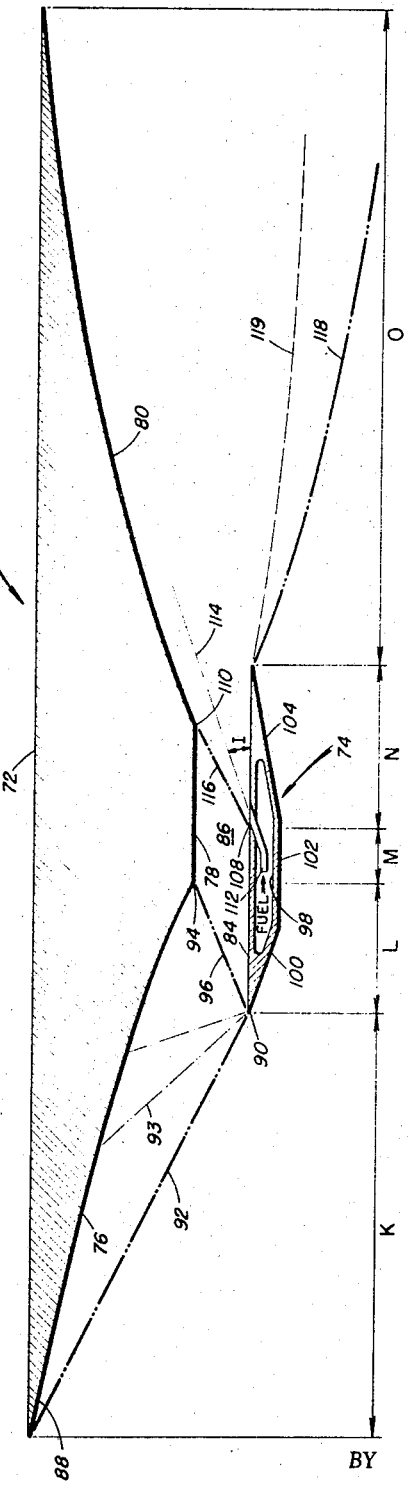
FIG. 6 is a diagrammatic, axial section of one embodiment of a hypersonic ramjet engine constructed according to the invention.
FIG. 7 is a side elevation of the hypersonic ramjet engine of FIG. 6.

Referring now to FIGS. 6 and 7, a hypersonic ramjet engine is indicated generally at 70, and comprises a main body 72 and a cowl 74. The main body includes a forward compression surface 76, a central, horizontal ramp portion 78, and a rearwardly-facing expansion surface 80, the compression surface 76 and the central ramp 78 being confined by a pair of side plates 82 (not shown in FIG. 6 for purposes of clarity) which are secured to the main body and to the cowl 74 by suitable means. The cowl 74 is longer than central ramp portion 78, and has a flat upper surface 84 positioned parallel to said ramp. The cowl 74 is positioned to overlap a portion of the compression surface 76 and the entire ramp 78, and together with the sideplates 82 and said ramp 78, defines a flow duct 86 of substantially uniform cross-sectional area throughout. The spacing between surfaces 78 and 84 is exaggerated in the drawings, and normally would be substantially less in an actual engine constructed according to the invention. As in the engine 4, interior struts (not shown) may, if desired, be provided within the duct 86 for purpose of giving stiffness and dimensional stability to the engine.

While the cowl surface 84 is shown completely flat in FIG. 6, better results may be obtained in some instances if the rear cowl lip is turned inwardly toward the body 72 in a manner analogous to the inturned surface 42 in FIG. 4. Thus, the use of such an inturned aft lip is considered to be within the teachings of the invention.

The forwardly-facing surface 76, following a small initial wedge 88 at its leading edge, is curved in the known manner to form an isentropic compression surface; said surface cooperates with the overlapping portion of cowl 74 to define a supersonic diffuser. The diffuser is designed for operation at a specified hypersonic flight velocity, say Mach 8, and the forward edge 90 of cowl 74 is so positioned that the compression shock wave 92 and Mach waves 93 formed on ramp 76, will coalesce on said edge 90 when the engine is cruising at said design velocity. Further, the cowl 74 and its forward edge 90 are so positioned relative to the edge 94 defined by the juncture of compression surface 76 and ramp portion 78 that when the engine is being flown at its design velocity a reflected shock wave 96 will be attached to and will extend between forward edge 90 and said edge 94. Thus, air flowing into the engine duct 86 must flow through both the compression waves from ramp 76 which coalesce on edge 90 and through the reflected shock wave 96.

For an engine operating in the hypersonic range the diffuser structure just described will reduce the airflow velocity by a few thousands of feet per second, but the air will still be moving at supersonic speed when it enters duct 86. In addition to its function of compressing the incoming air, the shock wave 96 also serves another purpose. As is known, air flowing at a supersonic velocity through an oblique shock wave, such as shock wave 96, will not only be compressed and experience a decrease in velocity, but also will undergo a change in flow direction. Thus, by properly positioning according to the known manner the cowl 74 relative to the body 72, the direction of flow of air entering duct 86 at supersonic velocity can be rendered substantially parallel to the surfaces 78 and 84.

The cowl 74 has a chamber 98 therein, and has on its lower surface an inclined front ramp 100, a central ramp 102 inclined at an angle substantially less than the angle of inclination of ramp 100, and an oppositely inclined, rearwardly-facing ramp 104. The ramp 100 merges with surface 84 at the forward edge 90 of the cowl to define a sharp edge, and when the engine is flown at supersonic velocities an oblique shock wave attaches to said edge. Air flowing through said cowl shock wave, which shock wave may be minimized by having the cowl as thin as is possible, passes over the under surface of the cowl, and is expanded as it flows over the edges defined by the junctures of ramps 100 and 102 and ramps 102 and 104.

The surface 84 has a row of ports 108 extending thereacross forwardly of the juncture 110 between ramp portion 98 and expansion surface 80. An inclined fuel injection nozzle tube 112 is secured within each of the ports 108, said tubes being disposed within chamber 98 and each being connected with a source of fuel. The nozzles defined by the nozzle tubes 112 are similar in arrangement and purpose to the nozzles 38, save that their central axes 114 are inclined rearwardly at an angle I from the surface 84 of the cowling.

It has been found that when fuel is injected at an inclined angle into a supersonic airstream an oblique shock wave is formed just forwardly of the point of injection; such an oblique shock wave is indicated at 116 in FIG. 6. It is known that the angle of inclination of the oblique shock wave caused by such fuel injection will be a few degrees greater than the angle of inclination of the axis of the fuel injection nozzle. For purposes of illustrating this relationship, assume a value of 20 degrees for the angle I in FIG. 6; if fuel is then injected at said angle into a Mach 6 airstream the angle of inclination for the oblique shock wave formed by the injected fuel will be about 28 degrees. In the engine of FIG. 6 it is desirable that the shock wave 116 extend from surface 84 to juncture 110 when the engine is operating at its design speed. This is easily accomplished for any given design flight speed and value for the angle I by merely properly positioning the row of ports 108 relative to said juncture 110.

It is thus seen that there are three separate shock waves through which incoming supersonic air must pass before fuel is added thereto and burned; the bow shock wave 92, reflected shock wave 96, and the fuel-injection-created shock wave 116. These three shock waves cooperate in the diffuser to reduce the Mach number of the airflow to about one-third of the vehicle's flight Mach number. Thus, air behind shock wave 116 is still flowing at a supersonic velocity.

In operation, the cycle of the hypersonic ramjet engine of FIGS. 6 and 7 is as follows. The engine is first accelerated to its designed hypersonic take-over speed, at which velocity the oblique shock waves 92 and 96 are formed. Air moving at said hypersonic velocity is then compressed isentropically over the region K by the surface 76, and a portion thereof is captured by cowl 74 and flows into duct 86. Air entering said duct passes through the reflected shock wave 96 in the region L, and then flows into duct region M where the airflow is smoothed and straightened.

A suitable fuel, which may be one of those previously described with relationship to the engine 4, is injected into duct 86 through nozzle tubes 112, forming shock wave 116. The airflow then passes through said shock wave 116, whereby its velocity, although still supersonic, is again slowed, and its pressure further increased. The supersonic, diffused airflow then enters region N, wherein fuel is mixed therewith and burned at nearly constant pressure. The hot gases resulting from combustion expand under the expansion surface 80 over the region O, producing thrust and a degree of lift. The external airflow along the underside of the cowl is compressed by a shock wave 118 at the trailing edge of the cowl, so that its pressure will match that of the burned gas along the interface 119.

It is thus seen that fuel combustion within a supersonic airstream is obtained in the hypersonic engine embodiment of FIGS. 6 and 7, and that the shock wave 116 caused by fuel injection is utilized to advantage in the diffusing process. Thus, the embodiment of the invention shown in FIGS. 6 and 7 is capable of flight at hypersonic speeds while simultaneously retaining the advantages derived from substantially external compression and expansion surfaces.

The hypersonic engine of FIGS. 6 and 7, in which fuel is injected into the airstream from the cowl 74, will provide an engine of minimum length, because the two shock waves 96 and 116 are generally parallel. However, in some situations cowl fuel injection equipment may require that the thickness of the cowl be so great as to create intolerable drag conditions. Further, it may prove structurally difficult in some instances to connect a fuel storage tank with the cowl-positioned injection nozzles. Thus, it is contemplated that alternatively the fuel may be injected from the main engine body rather than the cowl, and such a hypersonic engine is shown in FIGS. 8 and 9.

Referring to FIGS. 8 and 9, the hypersonic engine embodiment illustrated therein includes a main body 120 and a relatively thin cowl 122 supported in spaced relationship therewith. The body 120 has thereon a forward compression surface 124, a central ramp portion surface 126, and a rearwardly-facing expansion surface 128, said surfaces being identical to the corresponding surfaces in FIG. 6 except that the juncture between the flat, central ramp surface 126 and the expansion 128 is rounded at 130 to facilitate smooth gas flow. The cowl 122 is positioned similarly to the cowl 74 in FIG. 6, and has an inwardly turned aft lip 132 which functions as described hereinabove to direct burned gases over the expansion surface 128.

The main body 120 has a chamber 134 therein, and a plurality of fuel injection nozzels 136 are secured within angled bores in the ramp surface 126 and extend into chamber 134. The nozzles 136 extend across the ramp surface 126 in a manner analogous to that previously described, and are disposed to inject fuel at an angle I' into the flow space between the cowl 122 and the ramp portion 126.

When the hypersonic engine of FIGS. 8 and 9 is flown at design speed shock waves 138 and 140 and Mach waves 142 will be formed, said waves being analogous in formation and function to the corresponding waves in FIG. 6. Upon the injection of fuel into the flow duct shock wave 144 will be created, which wave corresponds to the shock wave 106 in FIG. 6; the shock wave 144 is reflected from the surface of the cowl 132, as is indicated at 146.

In operation the engine of FIGS. 8 and 9 operates similarly to the engine of FIGS. 6 and 7, incoming air being compressed and turned over the regions P and Q, and the airflow being straightened and smoothed over the region R. Fuel is injected into the airflow and is mixed therewith and burned at a nearly constant pressure over the region S. The hot gases then expand over the region T, producing thrust and a degree of lift. As in FIG. 8, the external airflow along the underside of the cowl 122 is compressed by a shock wave 148 at the trailing edge of the cowl, so that its pressure will match that of the burned gas along an interface 150.

The hypersonic engine embodiment of FIGS. 8 and 9 permits easier access to a fuel tank than the engine of FIGS. 6 and 7, and the thinness of the cowl therein is not limited because of fuel injection equipment; the latter obviously contributes to a reduction in cowl drag. However, it should be noted that because the fuel injection-created shock wave 144 is inclined oppositely to the reflected shock wave 140, the engine of FIG. 8 will normally be longer than the engine of FIG. 6.

Obviously, many modifications and variations of the present invention are possible in the light of the above teachings. It is therefore to be understood that within the scope of the appended claims the invention may be practiced otherwise than as specifically described.

What is claimed is:
1. A ramjet engine for flight at speeds in excess of sonic velocity, including
   a main body of rectangular cross-section,
   a cowl positioned centrally of said body and spaced therefrom, said cowl having a leading edge and a trail-edge,
   means securing the cowl to the main body and cooperating with said body and said cowl to define a flow duct,
   an external isentropic compression surface on said body and extending forwardly of said leading edge, said leading edge being so positioned relative to said compression surface that a shock wave formed by the latter when the engine is flown at a specified supersonic speed will impinge upon said leading edge,
   an external expansion surface on said body extending rearwardly of said trailing edge,
   fuel supply means within said body, and
   means within said body and communicating with said fuel supply means for injecting fuel into said duct.

2. In a ramjet engine for flight at speeds in excess of sonic velocity,
   a main body rectangular cross-section and having a forward ramp, a central ramp and a rearward ramp,
   a cowl,
   side plates mounting the cowl in spaced relation to the body and confining said ramps,
   said cowl being positioned under said central ramp and with said means defining a duct,
   said cowl having a forward lip turned toward said forward ramp and an aft lip turned toward said rearward ramp,
   fuel supply means within at least of one of said body and said cowl, and
   fuel injecting means within at least one of said body and said cowl and communicating with said fuel supply means and operative for injecting fuel from said supply means into said duct,
   said cowl being so spaced from said body and said fuel injecting means being so positioned that maximum thrust forces for the engine will be realized from the burning of fuel within the duct.

References Cited by the Examiner

UNITED STATES PATENTS

| | | | |
|---|---|---|---|
| 2,631,425 | 3/1953 | Nordfors | 60—35.6 |
| 3,008,669 | 11/1961 | Tanczos et al. | 60—35.6 |
| 3,069,119 | 12/1962 | Ferri | 60—35.6 |
| 3,080,711 | 3/1963 | Connors | 60—35.6 |
| 3,104,522 | 9/1963 | Pennington et al. | 60—35.6 |
| 3,143,401 | 8/1964 | Lambrecht | 60—39.74 X |

FOREIGN PATENTS 945,470  11/1948  France.

OTHER REFERENCES

"Recent Advances in Ramjet Combustion," by Gordon L. Dugger, ARS Journal, November 1959, volume 29, No. 11, pages 819–827.

A.G.A.R.D., "High Mach Number Air-Breathing Engines," Combustion and Propulsion Colloquim, Pergamon Press, N.Y. 1961, pages 14, 77 and 132 relied on.

MARK NEWMAN, *Primary Examiner.*

SAMUEL FEINBERG, *Examiner.*

D. HART, *Assistant Examiner.*